United States Patent
Wada

(10) Patent No.: US 8,336,589 B2
(45) Date of Patent: *Dec. 25, 2012

(54) PNEUMATIC TIRE WITH ELECTRICALLY CONDUCTIVE RUBBER MATERIAL

(75) Inventor: Takao Wada, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 217 days.

This patent is subject to a terminal disclaimer.

(21) Appl. No.: 12/741,339

(22) PCT Filed: Aug. 5, 2008

(86) PCT No.: PCT/JP2008/064030
§ 371 (c)(1),
(2), (4) Date: May 4, 2010

(87) PCT Pub. No.: WO2009/060647
PCT Pub. Date: May 14, 2009

(65) Prior Publication Data
US 2010/0243115 A1    Sep. 30, 2010

(30) Foreign Application Priority Data
Nov. 5, 2007 (JP) .................. 2007-287568

(51) Int. Cl.
B60C 19/08 (2006.01)
B60C 9/18 (2006.01)
B60C 9/20 (2006.01)
B60C 11/00 (2006.01)
B60C 13/00 (2006.01)
B60C 1/00 (2006.01)

(52) U.S. Cl. .................. 152/152.1; 152/209.5; 152/455; 152/525; 152/532; 152/537; 152/DIG. 2

(58) Field of Classification Search .............. 152/152.1, 152/DIG. 2, 532, 525, 209.5–209.7, 537, 152/455
See application file for complete search history.

(56) References Cited

U.S. PATENT DOCUMENTS

| 4,603,721 A * | 8/1986 | Kogure et al. ............. 152/209.5 |
| 5,518,055 A * | 5/1996 | Teeple et al. ............... 152/152.1 |
| 6,269,854 B1 * | 8/2001 | Matsuo et al. ............. 152/152.1 |
| 7,055,568 B2 * | 6/2006 | Tanaka ................... 152/209.5 X |

(Continued)

FOREIGN PATENT DOCUMENTS

EP    2 014 488 A1    1/2009

(Continued)

*Primary Examiner* — Adrienne C Johnstone
(74) *Attorney, Agent, or Firm* — Birch, Stewart, Kolasch & Birch, LLP

(57) ABSTRACT

Accumulation of static electricity is prevented while enhancing rolling resistance performance of tire. Tread rubber 2G has tread rubber body 15 forming tread ground contact surface 2S, under tread 16 disposed radially inward of the tread rubber body, and terminal portion 17 penetrating the tread rubber body in the radial direction, the under tread 16 being in contact with cushion rubbers 13 each having cushion main portion 13A interposed between edge portion 7E of tread-reinforcing layer 7 and carcass 6 over an overlap width W1 of 1 mm or more. Tread rubber body 15, topping rubber 7G of tread-reinforcing layer 7 and sidewall rubbers 3G are made of an insulating rubber material 20 having a volume resistivity of at least $1 \times 10^8$ Ω·cm, and under tread 16, terminal portion 17, cushion rubber 13, topping rubber 6G of carcass 6 and chafer rubber 11 are made of a conductive rubber material having a volume resistivity of less than $1 \times 10^8$ Ω·cm.

3 Claims, 7 Drawing Sheets

U.S. PATENT DOCUMENTS

| | | | |
|---|---|---|---|
| 7,060,146 B2 * | 6/2006 | Ikeda et al. | 152/532 X |
| 7,784,510 B2 * | 8/2010 | Numata | 152/209.5 |
| 2006/0102264 A1 | 5/2006 | Nicolas | |
| 2007/0000585 A1 | 1/2007 | Uchida et al. | |
| 2007/0163690 A1 | 7/2007 | Nobuchika et al. | |
| 2007/0215257 A1 | 9/2007 | Uchida et al. | |
| 2008/0308203 A1 * | 12/2008 | Kunisawa et al. | 152/152.1 |
| 2011/0024017 A1 * | 2/2011 | Miyazaki | |

FOREIGN PATENT DOCUMENTS

| | | | | |
|---|---|---|---|---|
| JP | 59153605 A | * | 9/1984 | |
| JP | 04015107 A | * | 1/1992 | 152/209.5 |
| JP | 05286305 A | * | 11/1993 | |
| JP | 06156016 A | * | 6/1994 | |
| JP | 11-180108 A | | 7/1999 | |
| JP | 2000-85316 A | | 3/2000 | |
| JP | 2001-191766 A | | 7/2001 | |
| JP | 2005-254859 A | | 9/2005 | |
| JP | 2006-143208 A | | 6/2006 | |
| JP | 2007-008269 A | | 1/2007 | |
| JP | 2007-176437 A | | 7/2007 | |
| JP | 2007-245918 A | | 9/2007 | |

* cited by examiner

PNEUMATIC TIRE WITH ELECTRICALLY CONDUCTIVE RUBBER MATERIAL

TECHNICAL FIELD

The present invention relates to a pneumatic tire capable of preventing electrostatic accumulation while improving a low rolling resistance performance of a tire.

BACKGROUND ART

A tire using silica as a reinforcing agent for a tread rubber instead of carbon black has been proposed in order to enhance a low fuel consumption performance of automobiles and to promote reduction of exhaust gas. Such a tire exhibits an excellent wet grip performance since the hysteresis loss on a low temperature side is maintained high. Moreover, the rolling resistance is reduced since a hysteresis loss on a high temperature side is low. Therefore, the tire has the advantage that both a low rolling resistance performance and a wet grip performance are achieved. However, silica brings about increase in electric resistance of a tire since it has a high electric insulation. Thus, silica causes a variety of electric malfunctions. For example, radio disturbance such as radio noise may take place owing to accumulation of static electricity in a vehicle.

Thus, in order to prevent such accumulation of static electricity, there is proposed for example a structure as shown in FIG. 8 wherein a tread rubber "a" comprises a tread rubber body "b" made of an insulating rubber material having a high silica content and an under tread "c" made of a conductive rubber material having a high carbon content and disposed radially inward of the tread rubber body "b", and to the under tread "c" is connected a terminal portion "d" which extends through the tread rubber body "b" to a tread ground contact surface "as" to become exposed there (see for example Patent Literature 1). In this structure, static electricity in a vehicle is discharged from the terminal portion "d" to a road surface through a rim "R", a bead portion, a skin rubber (i.e., clinch rubber "g1" and sidewall rubber "g2") forming an outer surface of a sidewall portion, and the under tread "c".
Patent Literature 1: JP-A-11-180108

DISCLOSURE OF THE INVENTION

Problem to be Solved by the Invention

In recent years, however, application of silica to other rubber members which are subjected to a relatively large flexure or which have a large rubber volume, e.g., a topping rubber of tread reinforcing layers "e" (such as belt layer and band layer), a sidewall rubber and a clinch rubber, is increasingly demanded as well as the tread rubber, in order to further improve the low rolling resistance performance of a tire. However, in the case that such rubber members are formed from an insulating rubber having a high silica content, a conventional electrically conducting path extending from the rim "R" to the under tread "c" is disconnected and, therefore, static electricity in a vehicle cannot be discharged.

Accordingly, it is an object of the present invention to provide a pneumatic tire capable of surely preventing accumulation of static electricity even in a case where a topping rubber of tread reinforcing layers, a sidewall rubber or a clinch rubber is formed from an insulating rubber having a high silica content to further improve the low rolling resistance performance. The present invention is based on forming a topping rubber of a carcass and a chafer rubber for preventing misalignment of a rim, which constitutes a bottom surface of a bead, from an electrically conductive rubber material, while a cushion rubber is disposed between an edge portion of a tread reinforcing layer and a carcass to have an extension portion which is in contact with an under tread layer with an overlapping width of at least 1 mm.

Means to Solve the Problem

The present invention is characterized by including:

a carcass comprising a carcass main portion which extends from a tread portion to bead cores of bead portions through sidewall portions, and turnup portions which are turned up around the bead cores from the axially inward to the axially outward of the tire at both ends of the carcass main portion, a tread-reinforcing layer disposed inside the tread portion and radially outward of the carcass, a tread rubber disposed radially outward of the tread-reinforcing layer and forming a tread ground contact surface of the tread portion, sidewall rubbers disposed axially outward of the carcass and forming outer surfaces of the sidewall portions, chafer rubbers for preventing rim misalignment each having a chafer base portion disposed in the bead portion and forming a bead bottom surface, and a rising portion which is bent at an axially outer end of the chafer base portion and rises radially outwardly in contact with an axially outer surface of the turnup portion of the carcass, clinch rubbers forming axially outer surfaces of the bead portions and extending radially outwardly in contact with an axially outer surface of the rising portion to connect to radially inner ends of the sidewall rubbers, and cushion rubbers each having a cushion main portion interposed between an edge portion of the tread reinforcing layer and the carcass, and an extension portion which is continuous with the cushion main portion and extends axially outwardly in contact with the carcass, wherein the carcass comprises at least one carcass ply in which an array of carcass cords are covered with a topping rubber, the tread-reinforcing layer comprises at least one tread-reinforcing ply in which an array of tread-reinforcing cords are covered with a topping rubber, the tread rubber comprises a tread rubber body forming the tread ground contact surface, an under tread which extends axially in the form of a sheet between the tread rubber body and the tread-reinforcing layer and which is in contact with the extension portion of the cushion rubber with an overlapping axial width of at least 1 mm, and a terminal portion which penetrates the tread rubber body inwardly and outwardly in the radial direction so that a radially outer end thereof is exposed on the tread ground contact surface and a radially inner end thereof is in contact with the under tread, at least the tread rubber body, the topping rubber of the tread-reinforcing layer and the sidewall rubbers are made of an insulating rubber material having a volume resistivity of at least $1 \times 10^8$ Ω·cm, and at least the under tread, the terminal portion, the cushion rubber, the topping rubber of the carcass and the chafer are made of a conductive rubber material having a volume resistivity of less than $1 \times 10^8$ Ω·cm.

The term "volume resistivity" as used herein denotes a value measured by an electric resistance meter ADVANTESTER 8340A under conditions of applied voltage 500 V, temperature 25° C. and humidity 50%.

The term "tread ground contact surface" as used herein denotes a region in the tread surface which can come into contact with a road surface when a tire is mounted on a normal rim and inflated to a normal inner pressure and this tire in the normal inner pressure state is then loaded with a normal load. The term "normal rim" denotes a rim defined for every tire in a standardizing system on which the tire is based and is, for example, "standard rim" in JATMA, "Design Rim" in TRA and "Measuring Rim" in ETRTO. The term "normal inner pressure" denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO", provided that in case of tires for passenger cars, the "normal inner pressure" is 180 kPa. The term "normal load" denotes a load defined for every tire in the standardizing system and is, for example, the maximum load capacity in JATMA, the maximum value recited in the table of "Tire Load Limits at Various Cold Inflation Pressures" in TRA, and the "Load Capacity" in ETRTO.

Effects of the Invention

Since the present invention is constituted as mentioned above, an electrically conductive path extending from the rim to the ground contact surface can be formed by the chafer rubber, the topping rubber of the carcass, the extension portion of the cushion rubber, the under tread and the terminal portion. Therefore, even in the case where other rubber members than the above, particularly rubber members deeply involved in low rolling resistance performance including tread rubber body, topping rubber of tread-reinforcing layer and sidewall rubber, are formed from, for example, an insulating rubber material having a high silica content, the electric resistivity of a tire can be reduced, so accumulation of static electricity can be surely prevented with further improving the low rolling resistance performance.

| | Explanation of Symbols |
|---|---|
| 2. | Tread portion |
| 2G. | Tread rubber |
| 2S. | Tread ground contact surface |
| 3. | Sidewall portion |
| 3G. | Sidewall rubber |
| 4. | Bead portion |
| 4S1. | Bead bottom |
| 4S2. | Outer surface |
| 5. | Bead core |
| 6. | Carcass |
| 6a. | Carcass main portion |
| 6b. | Carcass turnup portion |
| 6G, 7G. | Topping rubber |
| 7. | Tread-reinforcing layer |
| 7E. | Edge portion of tread-reinforcing layer |
| 11. | Chafer |
| 11A. | Chafer base portion |
| 11B. | Rising portion |
| 12. | Clinch rubber |
| 13. | Cushion rubber |
| 13A. | Cushion main portion |
| 13B. | Extension portion |
| 15. | Tread rubber body |
| 16. | Under tread |
| 17. | Terminal portion |
| 20. | Insulating rubber material |
| 21. | Conductive rubber material |

BEST MODE FOR CARRYING OUT THE INVENTION

Figure 1:
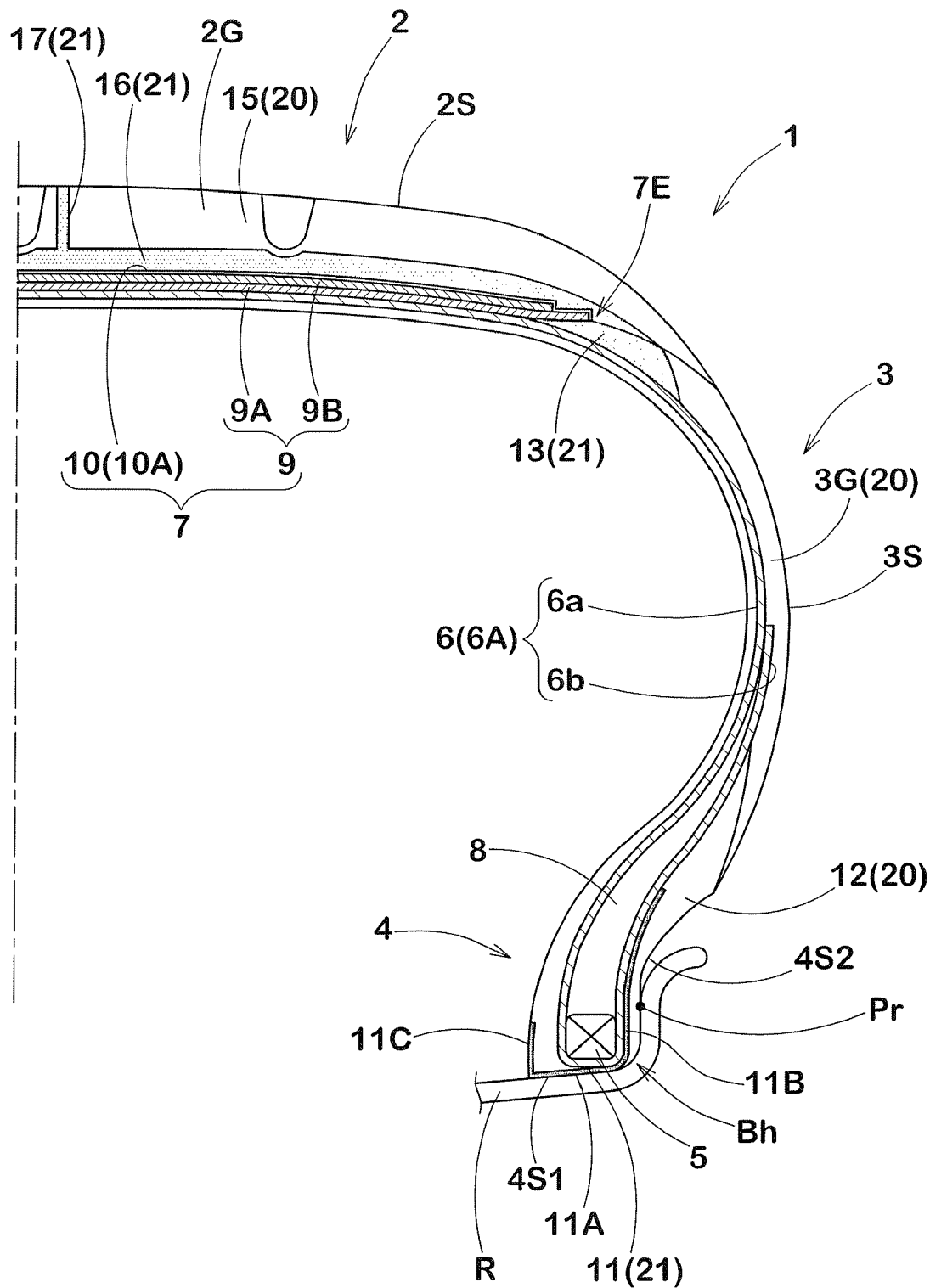
FIG. 1 is a cross sectional view of a pneumatic tire showing an embodiment of the present invention.

An embodiment of the present invention will now be explained with reference to the accompanying drawings. FIG. 1 is a meridian section view illustrating a pneumatic tire of the present invention in the normal inner pressure condition.

As shown in FIG. 1, a pneumatic tire 1 in this embodiment includes, a carcass 6 that extends from a tread portion 2 to bead cores 5 in bead portions 4 through sidewall portions 3, and a tread-reinforcing layer 7 that is disposed radially outward of the carcass 6 in the tread portion 2.

Figure 2:
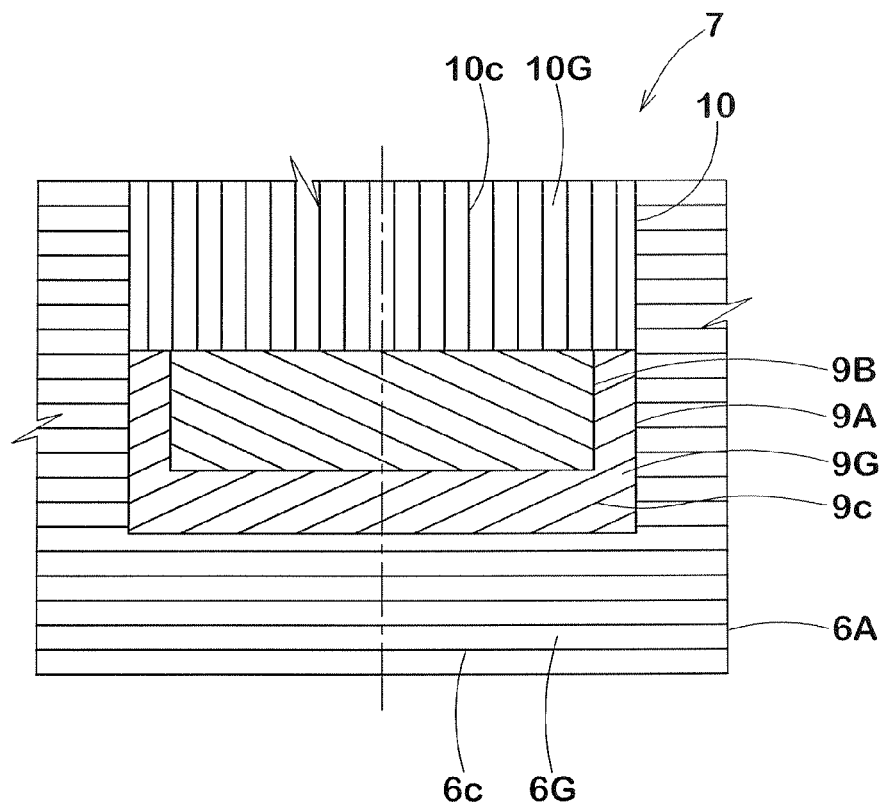
FIG. 2 is a conceptual view showing cord arrangement of a carcass and a tread-reinforcing layer developed in the flat.

The carcass 6 has, at both ends of a toroidal carcass main portion 6a extending between the bead cores 5, 5, carcass turnup portions 6b that are turned up around the bead cores 5 from the axially inside toward the axially outside of the tire. The carcass 6 comprises at least one carcass ply 6A (in this embodiment, one carcass ply) in which an array of carcass cords 6c (shown in FIG. 2) disposed at an angle, for example, of 70 to 90° with respect to the tire circumferential direction are covered with a topping rubber 6G. Between the carcass main portion 6a and the carcass turnup portion 6b are disposed bead apex rubbers 8 for bead reinforcement each of which is made of a hard rubber with a triangular cross section extending radially outwardly from the bead core 5.

The tread-reinforcing layer 7 comprises a belt layer 9 and/or a band layer 10. In this embodiment is shown a tread-reinforcing layer 7 comprising a belt layer 9 superposed on the carcass 6 and a band layer 10 superposed on the belt layer 9.

The belt layer 9 comprises at least two plies of belt cords 9c (shown in FIG. 2) which are arranged at an angle of, for instance, 15 to 40° with respect to the tire circumferential direction and are covered with a topping rubber 9G. The belt layer 9 shown in this embodiment comprises two belt plies 9A and 9B. The belt cords 9c in one ply cross the cords 9c in the other belt ply, whereby the belt rigidity is enhanced to reinforce the tread portion 2 over approximately full width thereof. The band layer 10 comprises a band ply 10A of a band cord 10c which is spirally wound at an angle of at most 5° with respect to the tire circumferential direction and is covered with a topping rubber 10G. The band layer 10 binds the belt layer 9 to improve steering stability, high speed durability and the like. As the band ply 10A are adoptable a pair of right and left edge band plies which are disposed to cover only axially outer edge portions of the belt layer 9, a full band ply which covers approximately full width of the belt layer 9, and a combination of them. The band layer 10 shown in this embodiment comprises one full band ply. The tread-reinforcing layer 7 may be composed of only the belt layer 9 or only the band layer 10. The above-mentioned belt cord 9c and band cord 10c are generically called reinforcing cords, and the topping rubbers 9G and 10G are generically called topping rubber 7G for the tread reinforcing layer 7. Further, the belt plies 9A and 9B and the band ply 10A are generically called tread-reinforcing plies.

The pneumatic tire 1 is provided at least with a tread rubber 2G disposed radially outward of the tread-reinforcing layer 7 to provide a tread ground contact surface 2S of the tread portion 2, sidewall rubbers 3G disposed axially outward of the carcass 6 to provide outer surfaces 3S (hereinafter referred to as sidewall outer surfaces 3S) of the sidewall portions 3, chafer rubbers 11 for preventing rim misalignment each having a chafer base portion 11A disposed in the bead portion 4 and forming a bead bottom surface 4S1, clinch rubbers 12 forming axially outer surfaces 4S2 (hereinafter referred to as bead outer surfaces 4S2) of the bead portions 4, and cushion rubbers 13 having cushion main portions 13A interposed between the carcass 6 and edge portions 7E of the tread reinforcing layer 7.

The chafer rubber 11 is for example a thin layer having a thickness of about 0.5 to about 1.5 mm and is formed from a hard rubber having an excellent wear resistance, e.g., a hard rubber having a rubber hardness (Durometer A hardness) of 70 to 95. The chafer rubber 11 is provided with the chafer base portion 11A forming the bead bottom surface 4S1, and a rising portion 11B which is bent at an axially outer end of the chafer base portion 11A and rises radially outwardly in contact with an axially outer surface of the carcass turnup portion 6b. At least it prevents damages caused by friction with a rim seat. The chafer rubber 11 shown in this embodiment has an inner rising portion 11C which is bent at an axially inner end of the chafer base portion 11A and extends along a tire inner cavity surface. The chafer rubber 11 may be made of only a rubber, or a canvas cloth or an array of organic fiber cords may be embedded in a rubber to reinforce the rubber, thereby enhancing the wear resistance.

The clinch rubber 12 is in contact with an axially outer surface of the rising portion 11B of the chafer rubber 11 and extends radially outwardly up to a position higher than an upper end of a rim flange. The clinch rubber 12 serves to reinforce the bead portion 4 to enhance the tire lateral rigidity in cooperation with the bead apex 8. Further, it provides the bead outer surface 4S2 to prevent damages caused by friction with the rim flange. The clinch rubber 12 shown in this embodiment extends upwardly from a bead heel end Bh, but the clinch rubber 12 may be formed to extend from a position near a point Pr separating from the rim flange.

The sidewall rubber 3G is made of a rubber softer than the clinch rubber 12 and the chafer rubber 11. It flexibly bends to follow tire deformation to thereby prevent generation of cracks in the sidewall outer surface 3S. A radially inner edge of the sidewall rubber 3G is continuous with a radially outer edge of the clinch rubber 12.

Figure 4:
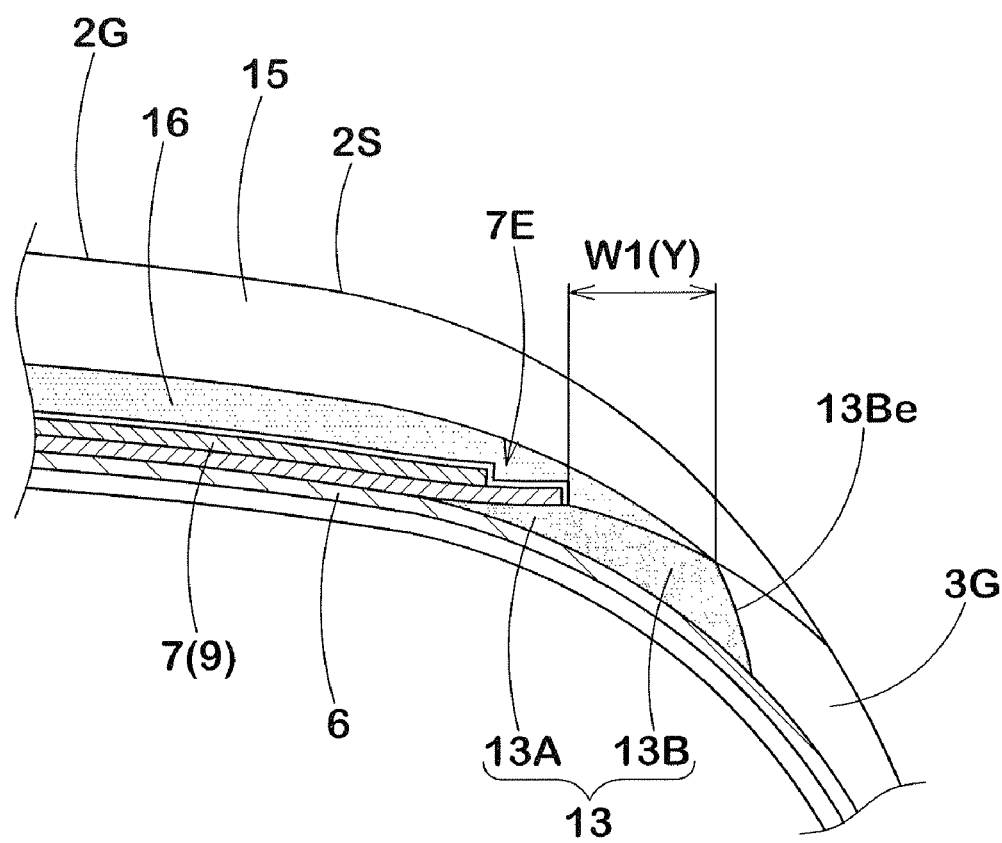
FIG. 4 is a cross sectional view showing a cushion rubber in an enlarged form.

The cushion rubber 13 is made of a rubber which is harder than the sidewall rubber 3G and is softer than the tread rubber 2G. As shown in FIG. 4, it is provided with a cushion main portion 13A having an approximately triangular cross section and interposed between an edge portion 7E of the tread-reinforcing layer 7 and the carcass 6, whereby stress concentration on the edge portion 7E is eased to prevent damages such as belt edge separation. The cushion rubber 13 is further provided with an extension portion 13B which is continuous with the cushion main portion 13A and extends axially outwardly in contact with the carcass 6. An axially outer end 13Be of the extension portion 13B terminates at a location apart from the outer surface of the tire by a distance of at least 2 mm and is continuous with a radially outer end of the sidewall rubber 3G.

Figure 3:
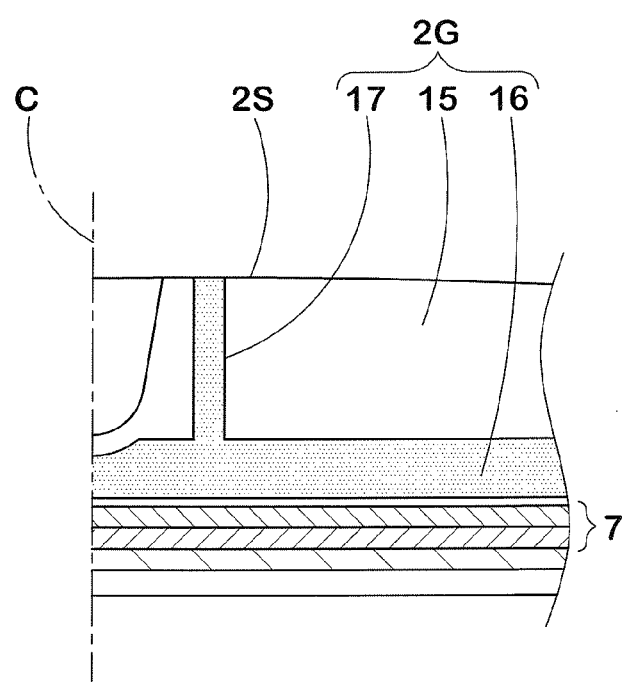
FIG. 3 is a cross sectional view showing a terminal portion in an enlarged form.

The tread rubber 2G comprises, as shown in FIGS. 3 and 4, a tread rubber body 15 which is a radially outer portion thereof and provides the tread ground contact surface 2S, an under tread 16 which extends axially between the tread rubber body 15 and the tread-reinforcing layer 7, and at least one terminal portion 17 which penetrates the tread rubber body 15 inwardly and outwardly in the radial direction so that a radially outer end thereof is exposed on the tread ground contact surface 2S and a radially inner end thereof is connected to the under tread 16.

The under tread 16 is in the form of a sheet having a thickness of at least 0.3 mm. At least one axially outer edge portion of the under tread 16 is in contact with the extension portion 13B of the cushion rubber 13 with an overlapping axial width W1 of at least 1 mm. In a contact area Y of the under tread 16 with the extension portion 13B, the extension portion 13B has a thickness gradually increasing toward the axially outward of the tire. The under tread 16 shown in this embodiment has both axially outer edge portions extending to come into contact with the extension portions 13B on both right and left sides, but one of the axially outer edge portions may be terminated at a location at which the terminal portion 17 is connected to the under tread 16, as occasion demands. From the viewpoint of contact with a road surface, the terminal portion 17 is preferably formed into a rib-like shape continuously extending in a circumferential direction of tire, but it may be in the form of columns discontinuous in the circumferential direction.

Figure 5A:
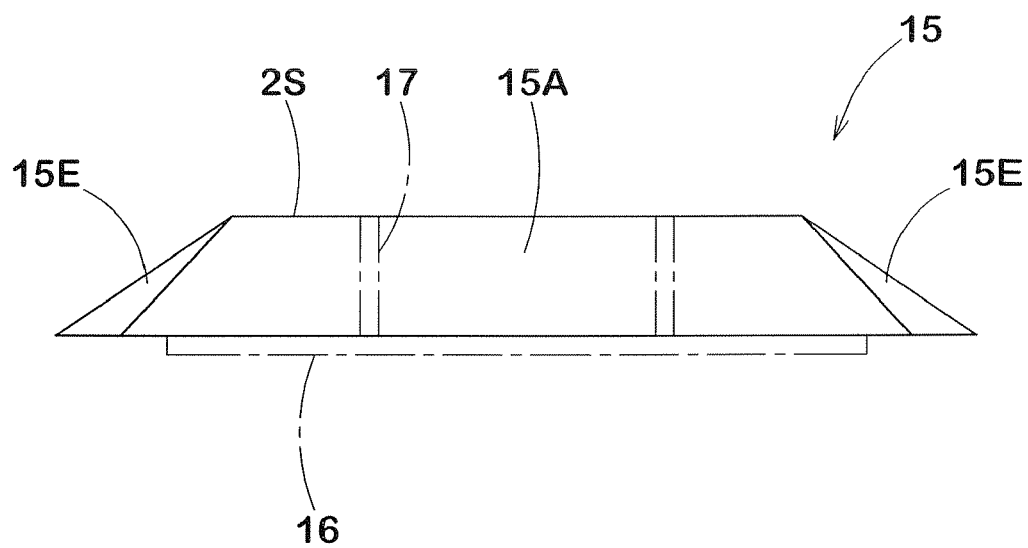
FIGS. 5(A) and 5(B) are cross sectional views showing other embodiments of a tread rubber body.

The tread rubber body 15 shown in this embodiment is formed of a single layer of a rubber body, but it may have a three layer structure comprising, as shown schematically in FIG. 5(A), a central rubber portion 15A providing the tread ground contact surface 2S, and wing rubber portions 15E, 15E disposed on both axially outer sides of the central rubber portion 15A and having an excellent adhesive property. Further, as shown schematically in FIG. 5(B), the central rubber portion 15A may be formed into a two layer structure comprising a cap rubber portion 15A1 located on a radially outer side and a base rubber portion 15A2 located radially inward of the cap rubber portion 15A1.

In the present invention, at least the tread rubber body 15, the topping rubber 7G of the tread-reinforcing layer 7 and the sidewall rubbers 3G are formed from an insulating rubber material 20 having a volume resistivity of at least $1 \times 10^8$ Ω·cm. Further, at least the under tread 16, the terminal portion 17, the cushion rubber 13, the topping rubber 6G of the carcass 6, and the chafer rubber 11 are formed from a conductive rubber material 21 having a volume resistivity of less than $1 \times 10^8$ Ω·cm.

Figure 5B:
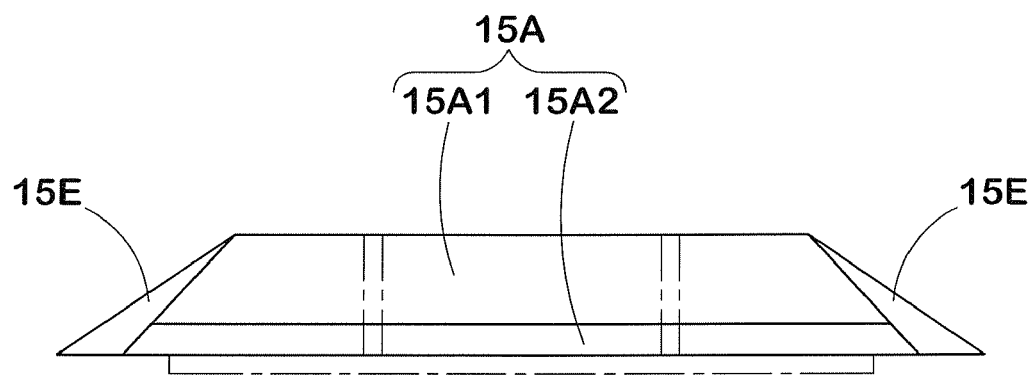

In this embodiment, as the insulating rubber material 20 is used a high silica content rubber containing 20 to 100 parts by weight of silica as a rubber reinforcing agent per 100 parts by weight of a rubber component. By using such a high silica content rubber for the tread rubber body 15, it becomes possible to enhance both the low rolling resistance performance and the wet grip performance. Further, by using it for the topping rubber 7G of the tread-reinforcing layer 7 which causes a large flexure at the time of deformation of tire, and for the sidewall rubber 3G which causes a large flexure and has a large rubber volume, the low rolling resistance performance can be further improved. From the viewpoint of low rolling resistance performance, it is also preferable to use the high silica content rubber for the clinch rubber 12. In the case that the tread rubber body 15 has a multi-layer structure, a portion forming the tread ground contact surface 2S, e.g., the central rubber portion 15A in the case of FIG. 5(A) and the cap rubber portion 15A1 in the case of FIG. 5(B), is formed from the insulating rubber material 20.

Examples of the rubber component are diene rubbers, for instant, natural rubber (NR), butadiene rubber (BR) which is a polymer of butadiene, so-called emulsion-polymerized styrene-butadiene rubber (E-SBR), solution-polymerized styrene-butadiene rubber (S-SBR), synthetic polyisoprene rubber (IR) which is a polymer of isoprene, nitrile rubber (NBR) which is a copolymer of butadiene and acrylonitrile, chloroprene rubber (CR) which is a polymer of chloroprene, and the like. These rubbers may be used alone or in the form of a blend of two or more kinds of rubbers.

The amount of silica is, as a matter of course, suitably determined within the above-mentioned range in accordance with physical properties required for each rubber member. Carbon black may be supplementarily used as a rubber reinforcing agent in addition to silica as occasion demands, but the amount thereof should be less than the amount of silica and is preferably at most 40%, especially at most 30%, of the amount of silica incorporated. Silica having a nitrogen adsorption specific surface area (BET) of 100 to 200 m$^2$/g and having such a colloidal property as a dibutyl phthalate (DBP) absorption capacity of at least 150 ml/100 g is preferred from the viewpoints of rubber-reinforcing effect, rubber processability and the like. As a silane coupling agent are suitably used bis(triethoxysilylpropyl) tetrasulfide and α-mercaptopropyltrimethoxysilane. In accordance with physical properties required for each rubber member, the insulating rubber material 20 may be suitably incorporated with general rubber additives, e.g., vulcanizing agent, vulcanization accelerator, accelerator activator and softener.

In tire 1 using such insulating rubber materials 20 in respective rubber members, at least under tread 16, terminal portion 17, cushion rubber 13, topping rubber 6G of the carcass 6 and chafer 11 are formed from a conductive rubber material 21 in order to form an electrically conductive path extending from the rim R to the tread ground contact surface 2S.

In this embodiment, as the conductive rubber material 21 is used a high carbon content rubber containing 30 to 100 parts by weight of carbon black as a rubber reinforcing agent per 100 parts by weight of a rubber component to decrease the electric resistivity. As the rubber component, rubbers selected from the diene rubbers mentioned above are used alone or as a blend of two or more rubbers. The amount of carbon black is, of course, suitably determined within the above-mentioned range in accordance with physical properties required for each rubber member.

As the carbon black are used those of HAF and ISAF grades having a nitrogen adsorption specific surface area of at least 70 m$^2$/g. Preferably, ISAF carbon black having a nitrogen adsorption specific surface area of at least 100 m$^2$/g is used from the viewpoint of enhancing the reinforcing property. Concrete examples of such carbon black are Showblack N330 (HAF) and Showblack N220 (ISAF) made by Showa Cabot Kabushiki Kaisha, and the like. In accordance with physical properties required for each rubber member, the conductive rubber material 21 may be suitably incorporated with general rubber additives, e.g., vulcanizing agent, vulcanization accelerator, accelerator activator and softener. In this embodiment, the terminal portion 17 is required to have a wear resistance and, therefore, it is different from the under tread 16 in any of the rubber component, the kind of carbon black and the amount of carbon black.

If the clinch rubber 12 is formed from the conductive rubber material 21 instead of the chafer rubber 11, a contact pressure between the clinch rubber 12 and the rim flange is low and there is a possibility that foreign matter enters between the clinch rubber 12 and the rim flange and, therefore, electric resistivity at the contacting part increases, resulting in insufficient and uncertain electric connection.

Figure 6A:
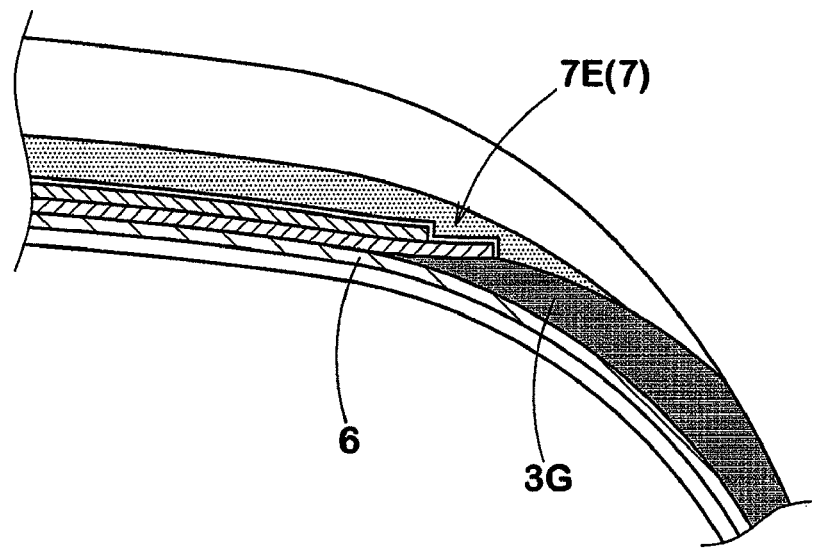
FIGS. 6(A) and 6(B) are cross sectional views showing a conventional structure in an outer end portion of the tread-reinforcing layer.
Figure 6B:
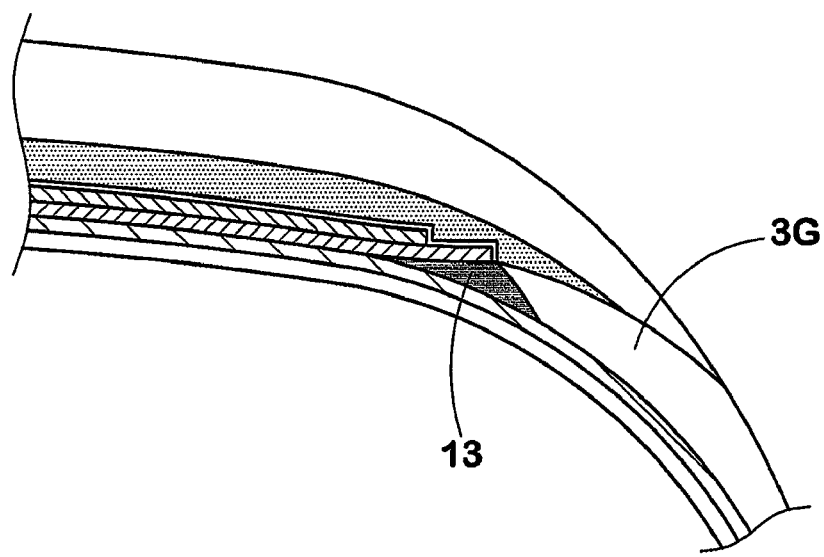

In tires having a so-called TOS (tread over sidewall) structure, particularly tires for passenger cars, there has been adopted a structure wherein generally a radially outer end portion of the sidewall rubber 3G is interposed, instead of the cushion rubber 13, between the edge portion 7E of the tread-reinforcing layer 7 and the carcass 6, or a structure wherein a radially outer end portion of the sidewall rubber 3G extends up to the edge of the tread-reinforcing layer 7 to cover the cushion rubber 13, as shown in FIGS. 6(A) and 6(B). Therefore, if the topping rubber 7G of the tread-reinforcing layer 7 and the sidewall rubber 7G are formed from the insulating rubber material 20 in tires having such conventional structures, it is difficult to achieve an electrical connection between the under tread 16 and the topping rubber 6G of the carcass 6. Thus, the electrical connection has been achieved by forming the cushion rubber 13 from the conductive rubber material 21 and providing the cushion rubber 13 with the extension portion 13B by bringing the extension portion 13B into contact with the under tread 16. In this case, it is necessary that an axial width W1 of an overlapping portion between the extension portion 13B and the under tread 16 is 1 mm or more. If the overlapping width W1 is less than 1 mm, the electric resistivity increases and no good electric connection is obtained. From such a point of view, the overlapping width W1 is preferably at least 2 mm, more preferably at least 3 mm. The upper limit of the overlapping width W1 is restricted by the outer end 13Be of the extension portion 13B which is separated from the outer surface of the tire by a distance of at least 2 mm.

In this embodiment, a high silica content rubber has been exemplified as the insulating rubber material 20, and a high carbon content rubber has been exemplified as the conductive rubber material 21. However, various rubber materials can be used as the insulating rubber material 20 and the conductive rubber material 21 in accordance with tire performances required. For example, the volume resistivity of a high silica content rubber is decreased to less than 1×10$^8$ Ω·cm to use it as the conductive rubber material 21 by adding an ion conducting material such as a lithium salt to the high silica content rubber.

A particularly preferable embodiment of the present invention has been described, but the present invention can be modified into various embodiments and carried out without being limited to only the embodiment shown in the drawings.

EXAMPLES

Pneumatic tires (size: 225/55R16) having a base structure shown in FIG. 1 were manufactured based on the specifications shown in Table 1, and the rolling resistance and electric resistance of the tires were measured. The results are shown in Table 1. Specifications other than those described in Table 1 are common to all tires. Compositions of rubber members used in Table 1 are described in Table 2. In Comparative Examples 2 and 3, a radially outer end portion of a sidewall rubber is interposed between the tread-reinforcing rubber and the carcass, instead of a cushion rubber, as shown in FIG. 6(A).

<Rolling Resistance>

The rolling resistance was measured under the following conditions by using a rolling resistance tester. The results are shown by an index of the reciprocal of the measured value based on a result of Example 1 regarded as 100. The larger the value, the smaller the rolling resistance and the better the rolling performance.

Rim: 16×7JJ
Inner pressure: 200 kPa
Load: 4.7 kN
Speed: 80 km/h

<Electric Resistance of Tires>

Figure 7:
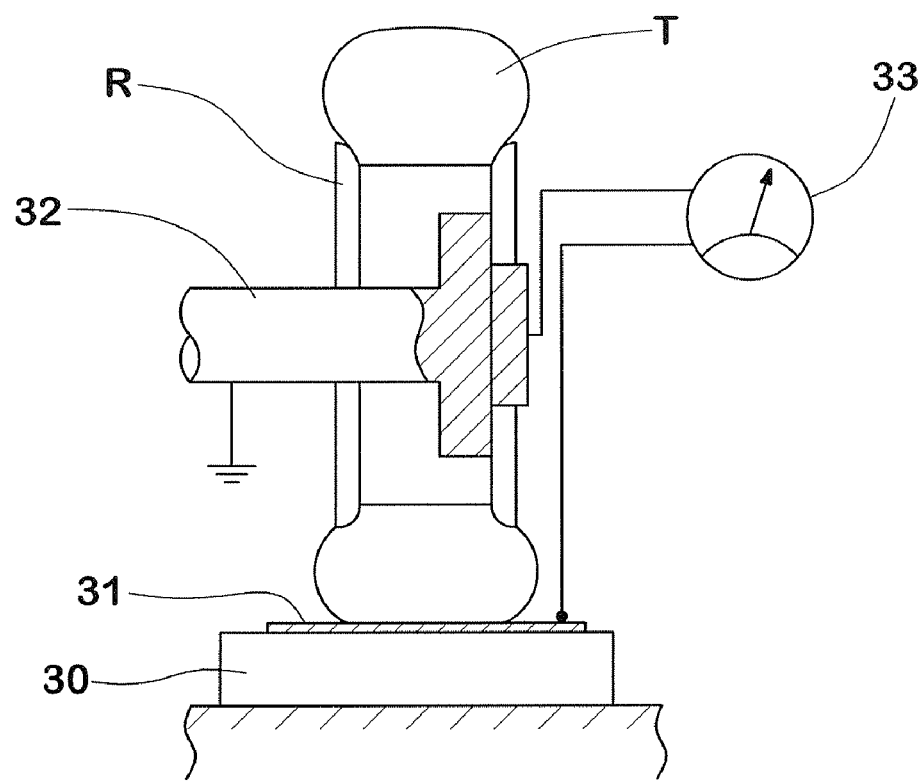
FIG. 7 is a schematic cross sectional view showing conceptually an electric resistance measuring device for tire.
Figure 8:
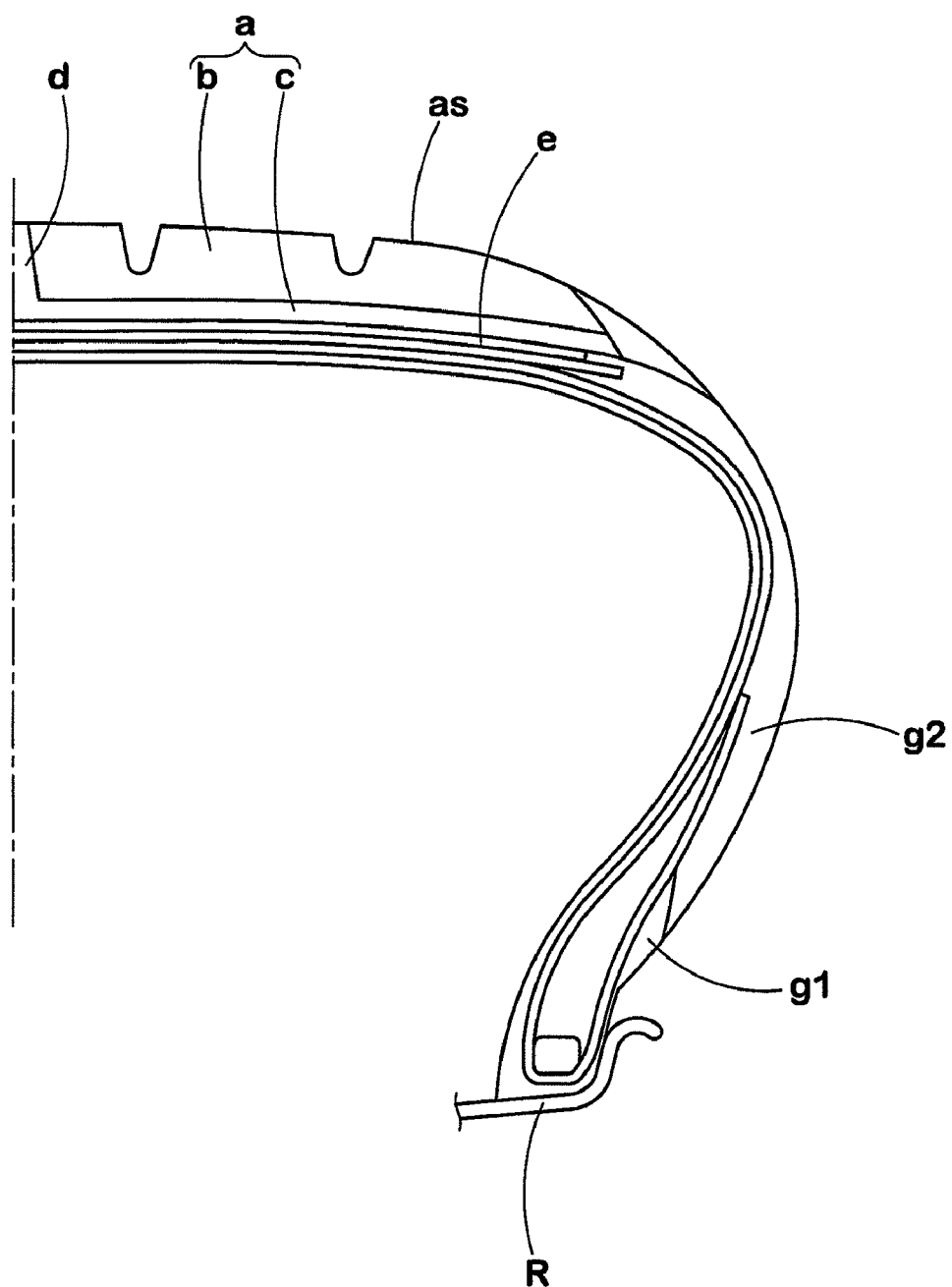
FIG. 8 is a schematic cross sectional view of a tire illustrating background art.

The electric resistance of a tire-rim assembly was measured according to a JATMA standard by using a measuring apparatus including, as shown in FIG. 7, a polished metal plate 31 (electric resistance: less than 10Ω) mounted on an insulating plate 30 (electric resistance: not less than $10^{12}$Ω), a conductive tire-mounting shaft 32 for holding the tire-rim assembly, and an electric resistance meter 33. Tire T to be tested was previously washed to sufficiently remove a releasing agent and a grime on the surface and was sufficiently dried. Other conditions are shown below.

Rim: made of an aluminum alloy, 16×7JJ
Inner pressure: 200 kPa
Load: 5.3 kN
Test environment temperature (testing room temperature): 25° C.
Humidity: 50%
Measuring range of the electric resistance meter: $10^3$ to 1.6× $10^{16}$Ω
Test voltage (applied voltage): 1,000 V Test was made as follows:

(1) Tire T was mounted on the rim to give a tire-rim assembly. At that time, an aqueous solution of a soap was applied as a lubricant to a contacting portion between them.

(2) After allowing to stand for 2 hours in the testing room, the tire-rim assembly was attached to the tire-mounting shaft 32.

(3) To the tire-rim assembly, the above-mentioned load was applied firstly for 0.5 minute, then released and applied again for 0.5 minute, released again and finally applied for 2 minutes.

(4) The test voltage was applied. After 5 minutes, the electric resistance between the tire-mounting shaft 32 and the metal plate 31 was measured by the electric resistance meter 33. The measurement was made at four positions spaced at 90 degrees in the tire circumferential direction, and the maximum value was adopted as the electric resistance (measured value) of the tire T.

TABLE 1

|  | Ex. 1 | Ex. 2 | Ex. 3 | Com. Ex. 1 | Com. Ex. 2 |
|---|---|---|---|---|---|
| Tread rubber body | Rubber 6 (ins.) | Rubber 6 (ins.) | Rubber 6 (ins.) | Rubber 6 (ins.) | Rubber 6 (ins.) |
| Sidewall rubber | Rubber 7b (ins.) | Rubber 7b (ins.) | Rubber 7b (ins.) | Rubber 7b (ins.) | Rubber 7b (ins.) |
| Topping rubber of tread-reinforcing layer | Rubber 8a (ins.) | Rubber 8a (ins.) | Rubber 8a (ins.) | Rubber 8a (ins.) | Rubber 8b (cond.) |
| Terminal portion | Rubber 5 (cond.) | Rubber 5 (cond.) | Rubber 5 (cond.) | Rubber 5 (cond.) | None |
| Under tread layer | Rubber 4 (cond.) | Rubber 4 (cond.) | Rubber 4 (cond.) | Rubber 4 (cond.) | Rubber 4 (cond.) |
| Cushion rubber | Rubber 3 (cond.) | Rubber 3 (cond.) | Rubber 3 (cond.) | Rubber 3 (cond.) | *1 |
| Overlapping width (mm) | 3 | 4 | 6 | 3 | 4 |
| Topping rubber of carcass | Rubber 2a (cond.) | Rubber 2a (cond.) | Rubber 2a (cond.) | Rubber 2b (ins.) | Rubber 2a (cond.) |
| Chafer rubber | Rubber 1a (cond.) | Rubber 1a (cond.) | Rubber 1a (cond.) | Rubber 1a (cond.) | Rubber 1a (cond.) |
| Clinch rubber | Rubber 9a (cond.) | Rubber 9b (ins.) | Rubber 9b (ins.) | Rubber 9b (ins.) | Rubber 9b (ins.) |
| Electric resistance of tire (×$10^8$ Ω) | 0.043 | 0.022 | 0.027 | not less than 1.0 | 0.041 |
| Rolling resistance | 100 | 102 | 102 | 105 | 97 |

|  | Com. Ex. 3 | Com. Ex. 4 | Com. Ex. 5 | Com. Ex. 6 |
|---|---|---|---|---|
| Tread rubber body | Rubber 6 (ins.) | Rubber 6 (ins.) | Rubber 6 (ins.) | Rubber 6 (ins.) |
| Sidewall rubber | Rubber 7a (cond.) | Rubber 7b (ins.) | Rubber 7b (ins.) | Rubber 7b (ins.) |
| Topping rubber of tread-reinforcing layer | Rubber 8a (ins.) | Rubber 8a (ins.) | Rubber 8a (ins.) | Rubber 8a (ins.) |
| Terminal portion | Rubber 5 (cond.) | Rubber 5 (cond.) | Rubber 5 (cond.) | Rubber 5 (cond.) |
| Under tread layer | Rubber 4 (cond.) | Rubber 4 (cond.) | Rubber 4 (cond.) | Rubber 4 (cond.) |
| Cushion rubber | *1 | Rubber 3 (cond.) | Rubber 3 (cond.) | Rubber 3 (cond.) |
| Overlapping width (mm) | 3 | 4 | 0 to less than 1 | 3 |
| Topping rubber of carcass | Rubber 2a (cond.) | Rubber 2a (cond.) | Rubber 2a (cond.) | Rubber 2a (cond.) |
| Chafer rubber | Rubber 1a (cond.) | Rubber 1b (ins.) | Rubber 1a (cond.) | Rubber 1b (ins.) |

TABLE 1-continued

| Clinch rubber | Rubber 9b (ins.) | Rubber 9b (ins.) | Rubber 9b (ins.) | Rubber 9a (cond.) |
|---|---|---|---|---|
| Electric resistance of tire (×10$^8$ Ω) | 0.037 | not less than 1.0 | 0.08-1.0 | not less than 1.0 |
| Rolling resistance | 94 | 103 | 102 | 101 |

*1A radially outer end portion of sidewall rubber serves as a cushion rubber.

TABLE 2

| | Rubber 1a (cond.) | Rubber 1b (ins.) | Rubber 2a (cond.) | Rubber 2b (ins.) | Rubber 3 (cond.) | Rubber 4 (cond.) | Rubber 5 (cond.) |
|---|---|---|---|---|---|---|---|
| Rubber component | | | | | | | |
| Natural rubber | 80 | 80 | 75 | 75 | 60 | 75 | 70 |
| SBR 1500 | 20 | 20 | — | — | — | — | 30 |
| SBR 1502 | — | — | 25 | 25 | — | 25 | — |
| BR | — | — | — | — | 40 | — | — |
| Reinforcing agent | | | | | | | |
| Carbon black (ISAF) | 50 | 10 | — | — | 45 | 20 | 55 |
| Carbon black (HAF) | — | — | 45 | — | — | 25 | — |
| Silica | — | 40 | — | 45 | — | — | — |
| Silane coupling agent | — | 4.0 | — | 4.5 | — | — | — |
| Additives | | | | | | | |
| Aromatic oil | 5 | 5 | — | — | — | — | — |
| Wax | 1.5 | 4.5 | — | — | 1 | — | 1.5 |
| Antioxidant | 1 | 1 | 2 | 2 | 3 | 2 | 2 |
| Cobalt stearate | — | — | — | — | — | — | — |
| Stearic acid | 1.5 | 1.5 | 1 | 1 | 1 | 1 | 1 |
| Zinc oxide | 3.5 | 3.5 | 3 | 3 | 3 | 3 | 3 |
| Sulfur | 1.6 | 1.6 | 3 | 3 | 2 | 2 | 1.8 |
| Accelerator | 0.8 | 0.8 | 1 | 1 | 1 | 1 | 1 |
| Volume resistivity (Ω·cm) | $1 \times 10^6$ | not less than $1 \times 10^8$ | $1 \times 10^6$ | not less than $1 \times 10^8$ | $1 \times 10^6$ | $1 \times 10^6$ | $1 \times 10^6$ |

| | Rubber 6 (ins.) | Rubber 7a (cond.) | Rubber 7b (ins.) | Rubber 8a (ins.) | Rubber 8b (cond.) | Rubber 9a (cond.) | Rubber 9b (ins.) |
|---|---|---|---|---|---|---|---|
| Rubber component | | | | | | | |
| Natural rubber | — | 60 | 60 | 100 | 100 | 60 | 60 |
| SBR 1500 | 100 | — | — | — | — | — | — |
| SBR 1502 | — | — | — | — | — | — | — |
| BR | — | 40 | 40 | — | — | 40 | 40 |
| Reinforcing agent | | | | | | | |
| Carbon black (ISAF) | — | 45 | — | — | — | 60 | — |
| Carbon black (HAF) | — | — | — | — | 55 | — | — |
| Silica | 50 | — | 45 | 55 | — | — | 60 |
| Silane coupling agent | 5.0 | — | 4.5 | 5.5 | — | — | 6.0 |
| Additives | | | | | | | |
| Aromatic oil | — | — | — | — | — | 5 | 5 |
| Wax | 1 | 1 | 1 | — | 1 | 1.5 | 1.5 |
| Antioxidant | 2 | 3 | 3 | 2 | 2 | 1 | 1 |
| Cobalt stearate | 2 | 2 | — | — | — | — | — |
| Stearic acid | 1 | 1 | 1 | 1 | 1 | 1 | 1 |
| Zinc oxide | 3 | 3 | 3 | 10 | 10 | 3 | 3 |
| Sulfur | 1.5 | 2 | 2 | 5.5 | 5.5 | 1.5 | 1.5 |
| Accelerator | 1 | 1 | 1 | 0.9 | 0.9 | 0.8 | 1.1 |
| Volume resistivity (Ω·cm) | not less than $1 \times 10^8$ | $1 \times 10^6$ | not less than $1 \times 10^8$ | not less than $1 \times 10^8$ | $1 \times 10^6$ | $1 \times 10^6$ | not less than $1 \times 10^8$ |

The volume resistivity denotes a value measured using a rubber specimen having a size of 15 cm × 15 cm × 2 mm thickness and an electric resistance meter (ADVANTESTER 8340A) under conditions of applied voltage 500 V, temperature 25° C and humidity 50%.

It is observed in the table that the tires of the present invention can reduce electric resistance of tire while improving the rolling resistance performance.

What is claimed is:
1. A pneumatic tire including:
a carcass comprising a carcass main portion which extends from a tread portion to bead cores of bead portions through sidewall portions, and turnup portions which are turned up around the bead cores from the axially inward to the axially outward of the tire at both ends of the carcass main portion,
a tread-reinforcing layer disposed inside the tread portion and radially outward of the carcass,
a tread rubber disposed radially outward of the tread-reinforcing layer and forming a tread ground contact surface of the tread portion, sidewall rubbers disposed axially outward of the carcass and forming outer surfaces of the sidewall portions, chafer rubbers for preventing rim misalignment each having a chafer base portion disposed in the bead portion and forming a bead bottom surface, and a rising portion which is bent at an axially outer end of the chafer base portion and rises radially outwardly in contact with an axially outer surface of the turnup portion of the carcass, clinch rubbers forming axially outer surfaces of the bead portions and extending radially outwardly in contact with an axially outer surface of the rising portion to connect to radially inner ends of the sidewall rubbers, cushion rubbers each having a cushion main portion interposed between an edge portion of the tread-reinforcing layer and the carcass, and an extension portion which is continuous with the cushion main portion and extends axially outwardly in contact with the carcass to an axially outer end surface being located apart from the outer surface of the tire by a distance of at least 2 mm and being continuous with the radially outer end of the sidewall rubber, wherein the carcass comprises at least one carcass ply in which an array of carcass cords are covered with a topping rubber, the tread-reinforcing layer comprises at least one tread-reinforcing ply in which an array of tread-reinforcing cords are covered with a topping rubber, the tread rubber comprises a tread rubber body forming the tread ground contact surface, an under tread which extends axially in the form of a sheet between the tread rubber body and the tread-reinforcing layer and which is in contact with the extension portion of at least one of the cushion rubbers with an overlapping axial width of at least 1 mm, the upper limit of the overlapping width being restricted by the axially outer end surface of the extension portion, and a terminal portion which penetrates the tread rubber body inwardly and outwardly in the radial direction so that a radially outer end thereof is exposed on the tread ground contact surface and a radially inner end thereof is in contact with the under tread, the extension portion having a thickness gradually increasing toward the axially outward of the tire in the contact area of the under tread with the extension portion, at least the tread rubber body, the topping rubber of the tread-reinforcing layer and the sidewall rubbers are made of an insulating rubber material having a volume resistivity of at least $1\times10^8$ Ω·cm, and at least the under tread, the terminal portion, the cushion rubbers, the topping rubber of the carcass and the chafer rubbers are made of a conductive rubber material having a volume resistivity of less than $1\times10^8$ Ω·cm.

2. The pneumatic tire of claim 1, wherein the clinch rubber is made of said insulating rubber material.

3. The pneumatic tire of claim 1 or 2, wherein said conductive rubber material contains 30 to 100 parts by weight of carbon black as a rubber reinforcing agent per 100 parts by weight of a rubber component comprising a diene rubber, said carbon black having a nitrogen adsorption specific surface area (BET) of at least 100 $m^2/g$, and said insulating rubber material contains 20 to 100 parts by weight of silica as a rubber reinforcing agent per 100 parts by weight of a rubber component comprising a diene rubber.

* * * * *